(12) United States Patent
Robinson

(10) Patent No.: US 7,995,273 B1
(45) Date of Patent: Aug. 9, 2011

(54) DUAL PROJECTION SCREEN STRUCTURE

(75) Inventor: Mark K Robinson, Redondo Beach, CA (US)

(73) Assignee: Stewart Flimscreen Corporation, Torrance, CA (US)

( * ) Notice: Subject to any disclaimer, the term of this patent is extended or adjusted under 35 U.S.C. 154(b) by 0 days.

(21) Appl. No.: 12/852,966

(22) Filed: Aug. 9, 2010

(51) Int. Cl.
G03B 21/56 (2006.01)

(52) U.S. Cl. ..................... 359/449; 359/450; 359/461

(58) Field of Classification Search .............. 359/449, 359/450, 460, 443; 348/841–842; 160/239
See application file for complete search history.

(56) References Cited

U.S. PATENT DOCUMENTS

| | | | |
|---|---|---|---|
| 3,008,518 A | 11/1961 | Hayes | |
| 3,101,644 A | 8/1963 | Lopez-Henriquez | |
| 3,444,919 A | 5/1969 | Karoll | |
| 3,882,921 A | 5/1975 | Sandall | |
| 4,020,889 A | 5/1977 | Karoll | |
| 4,238,969 A | 12/1980 | Krause | |
| 4,357,978 A | 11/1982 | Keller et al. | |
| 4,365,660 A | 12/1982 | Henkenjohann | |
| 4,705,355 A | 11/1987 | Espo | |
| 5,353,152 A | 10/1994 | Realmuto | |
| 5,392,835 A | 2/1995 | Wildt | |
| 5,467,266 A | 11/1995 | Jacobs et al. | |
| 5,523,880 A * | 6/1996 | Pidgeon et al. | 359/450 |
| 5,566,736 A | 10/1996 | Crider et al. | |
| 5,570,138 A * | 10/1996 | Baron | 348/744 |
| 5,732,419 A | 3/1998 | Feist | |
| 6,111,693 A | 8/2000 | Crews et al. | |
| 6,189,592 B1 | 2/2001 | Domel | |
| 6,296,040 B1 | 10/2001 | Schaap | |
| 6,407,798 B2 | 6/2002 | Graves et al. | |
| 6,595,262 B2 | 7/2003 | Chen | |
| 6,614,594 B2 | 9/2003 | Murasugi et al. | |
| 6,816,308 B1 | 11/2004 | Shopp | |
| 6,901,987 B1 | 6/2005 | Graham | |
| 7,165,688 B2 | 1/2007 | Cameron | |
| 7,328,466 B1 | 2/2008 | Bowen | |
| 7,397,603 B2 | 7/2008 | Peterson et al. | |
| 7,637,575 B2 | 12/2009 | Amari et al. | |
| 7,706,066 B2 | 4/2010 | Adams et al. | |
| 7,710,646 B2 | 5/2010 | Stewart et al. | |
| 2004/0057109 A1 | 3/2004 | Edney | |
| 2008/0174865 A1 | 7/2008 | Stewart | |
| 2009/0277593 A1 | 11/2009 | Stewart | |
| 2009/0277594 A1 | 11/2009 | Stewart et al. | |

FOREIGN PATENT DOCUMENTS

WO  WO 2009/089597  7/2009

* cited by examiner

*Primary Examiner* — Christopher Mahoney
(74) *Attorney, Agent, or Firm* — Hasse & Nesbitt LLC; Donald E. Hasse

(57) ABSTRACT

An integral, dual projection screen structure for displaying an image from a projection source. The projection screen structure comprises a frame; a fixed projection screen disposed within and mounted to the frame; a first masking panel disposed within the frame over the fixed projection screen; a movable projection screen disposed within the frame adjacent the first masking panel, the movable screen having an operable roller for rolling and unrolling the screen and being mounted at the top portion of the frame; and a second masking panel disposed within the frame over the movable projection screen.

21 Claims, 8 Drawing Sheets

DUAL PROJECTION SCREEN STRUCTURE

FIELD OF INVENTION

The present invention relates generally to a projection screen for use in displaying imagery from a television, motion picture projector, video projector, computer generated image display, or the like, and more particularly to an integral projection screen configured to include both a fixed projection screen and a movable projection screen having a roller.

BACKGROUND OF INVENTION

Projection screens are used in a large variety of situations for slide or motion picture projection, television or computer generated image display, or other imagery projection. Screen systems are particularly useful in a home theater or conference room setting. The formatting of the various kinds of imagery projection results in the need for various styles of fixed and movable projection screens. The screens may comprise different materials and have varied textures and optical properties to facilitate viewing of an image projected thereon. These optical properties may include, for example, gain, contrast (e.g., ambient light rejection), resolution, uniformity, projection format, etc. Types of screens that have different optical properties include white matte, silver matte, and pearlescent screens. White matte screens work well in most situations where presentation material is being projected and ambient light is controllable. White screens have about the same brightness from all viewing angles and are widely used. Silver screens are designed with metallic pigments embedded in the material to provide a highly reflective surface. These screens are well suited for 3-D films because they do not de-polarize projected light, which has been polarized to isolate left and right eye content. Silver screens maintain the polarization of the images from the projection source, and provide a brighter image than possible on a white matte screen. In order to accommodate the different styles of projection screens, numerous screen systems are disclosed in the art. Typically, fixed projection screens are silver matte or pearlescent screens, whereas movable projection screens are white matte screens.

In view of the above, it would be desirable to provide a projection screen structure for home theaters, post production and other viewing environments that integrates a fixed screen and a movable screen into a single structure, where said screens have different surfaces with unique optical properties. It would also be desirable to hang the movable screen such that when it is unrolled in the projected position, the screen is located in nearly the same optical plane as the fixed screen. Each screen would thus hang in nearly the same plane, thereby eliminating the need to refocus the optical projection equipment used to project the image on the two screens. Additionally, it would be desirable for each screen's surface perimeter to be matted within a fixed position, light absorbing mask, as opposed to a painted border commonly used on a roller deployed screen surface.

SUMMARY OF INVENTION

The present invention relates to an integral projection screen structure for displaying an image from a projection source, comprising: (a) a frame having generally parallel top and bottom portions and generally parallel first and second opposing side portions, each side portion forming a channel; (b) a fixed projection screen comprising a sheet of material having a projection surface for displaying an image projected thereon, said sheet of material having a front side and a back side, top and bottom edges and first and second side edges; a fixed mounting structure defined by generally parallel top and bottom portions and generally parallel side portions for supporting said sheet of material in a mounted condition; and means for tensioning said sheet of material onto said mounting structure; said fixed projection screen being disposed within and mounted to said frame; (c) a first masking panel disposed within said frame over at least the respective first and second side edges of the front side of the sheet of material in the fixed projection screen; (d) a movable projection screen disposed within said frame adjacent the first masking panel, said movable projection screen comprising an operable roller for rolling and unrolling the screen and being mounted at the top portion of said frame; and a flexible sheet of material having a projection surface for displaying an image projected thereon, said sheet of material having a front side and a back side, a top edge connected to the roller and being movable between a rolled condition and an unrolled condition, a bottom edge opposite the top edge, and first and second opposing side edges for disposition within the channels formed by the side portions of the frame when the sheet is in the unrolled condition; and (e) a second masking panel disposed within said frame over at least the respective first and second side edges of the front side of the sheet of material in the movable projection screen.

The invention also relates to an integral projection screen structure as described above in which the movable projection screen further comprises a motor operatively connected to the roller such that the roller rotates about its longitudinal axis in response to the operation of the motor. The top portion of the frame houses the roller and the motor, and the bottom portion of the frame forms a channel for receiving the bottom edge of the movable screen when in an unrolled condition.

In another embodiment, the invention relates to an integral projection screen structure as described above in which the moveable screen is a white matte screen and the fixed screen is a silver screen.

In yet another embodiment, the projection screen structure comprises electronically controllable motorized means operatively connected to said first and second masking panels for selectively moving masking panels, and the first and second masking panels are each made of velour material.

DETAILED DESCRIPTION OF THE INVENTION

Figure 1:
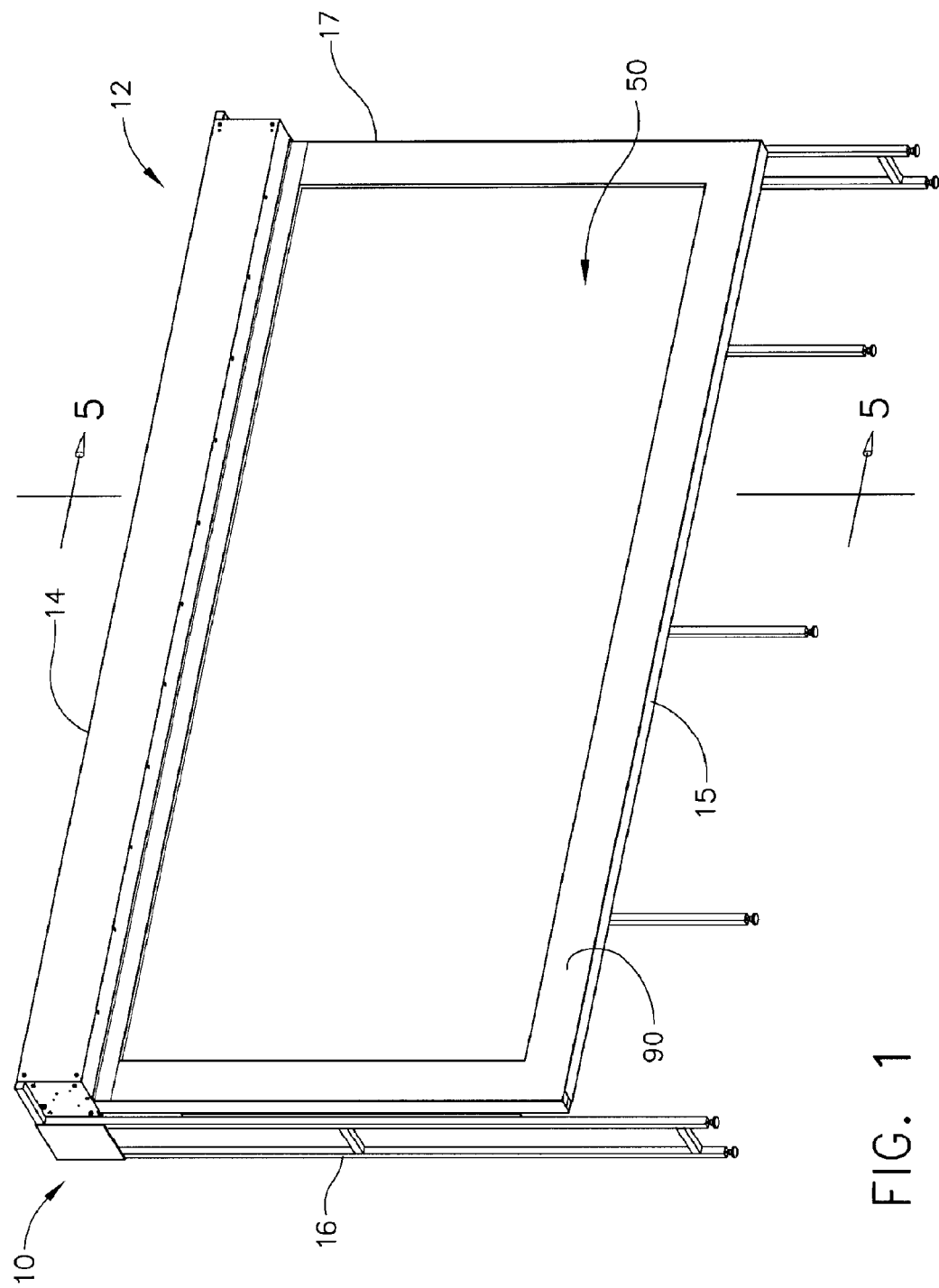
FIG. 1 is a front perspective view of an integral projection screen structure of the invention, looking slightly upward at the structure.
Figure 2:
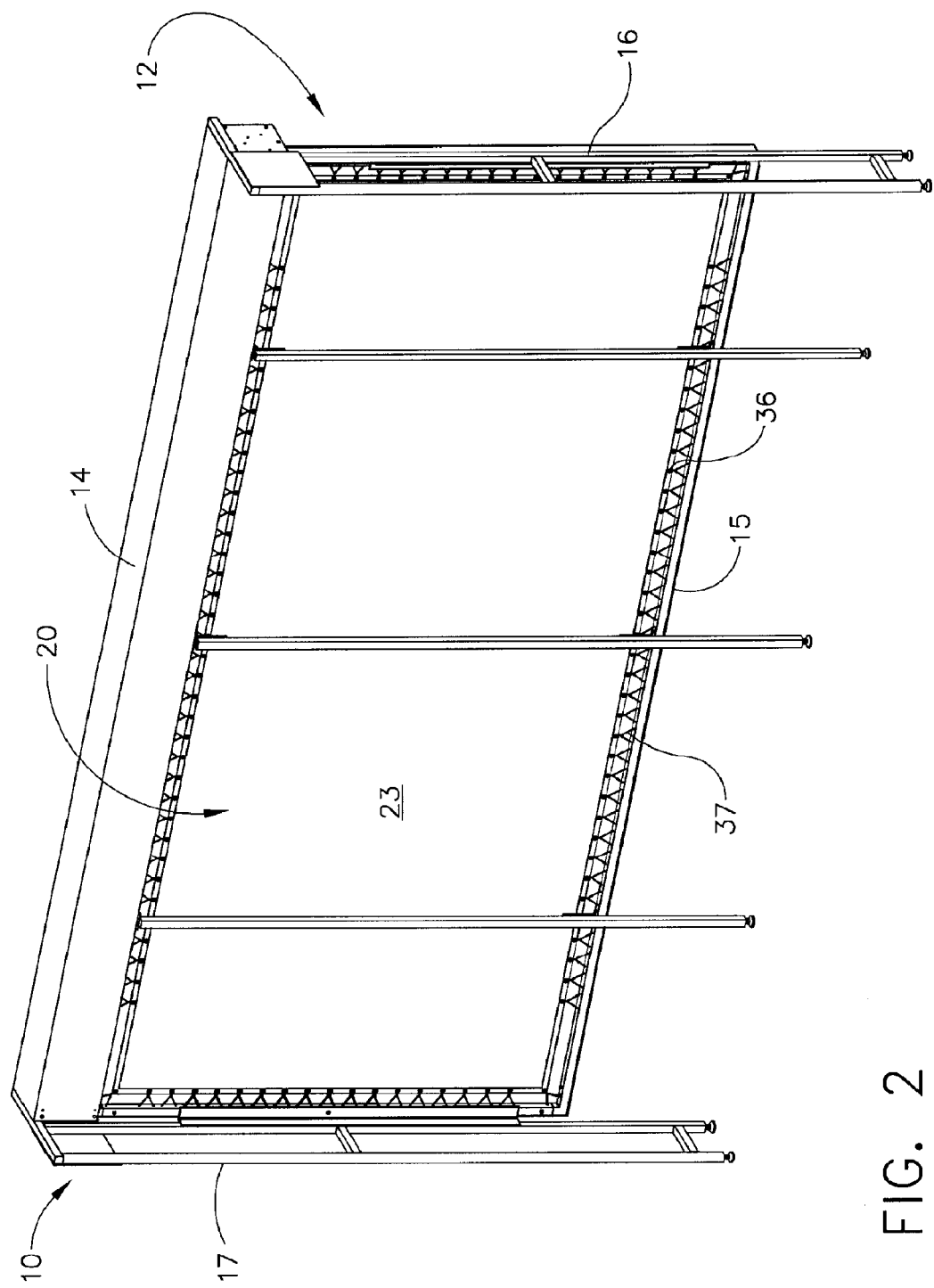
FIG. 2 is a rear perspective view of the projection screen structure of FIG. 1, looking slightly downward at the structure.
Figure 3:
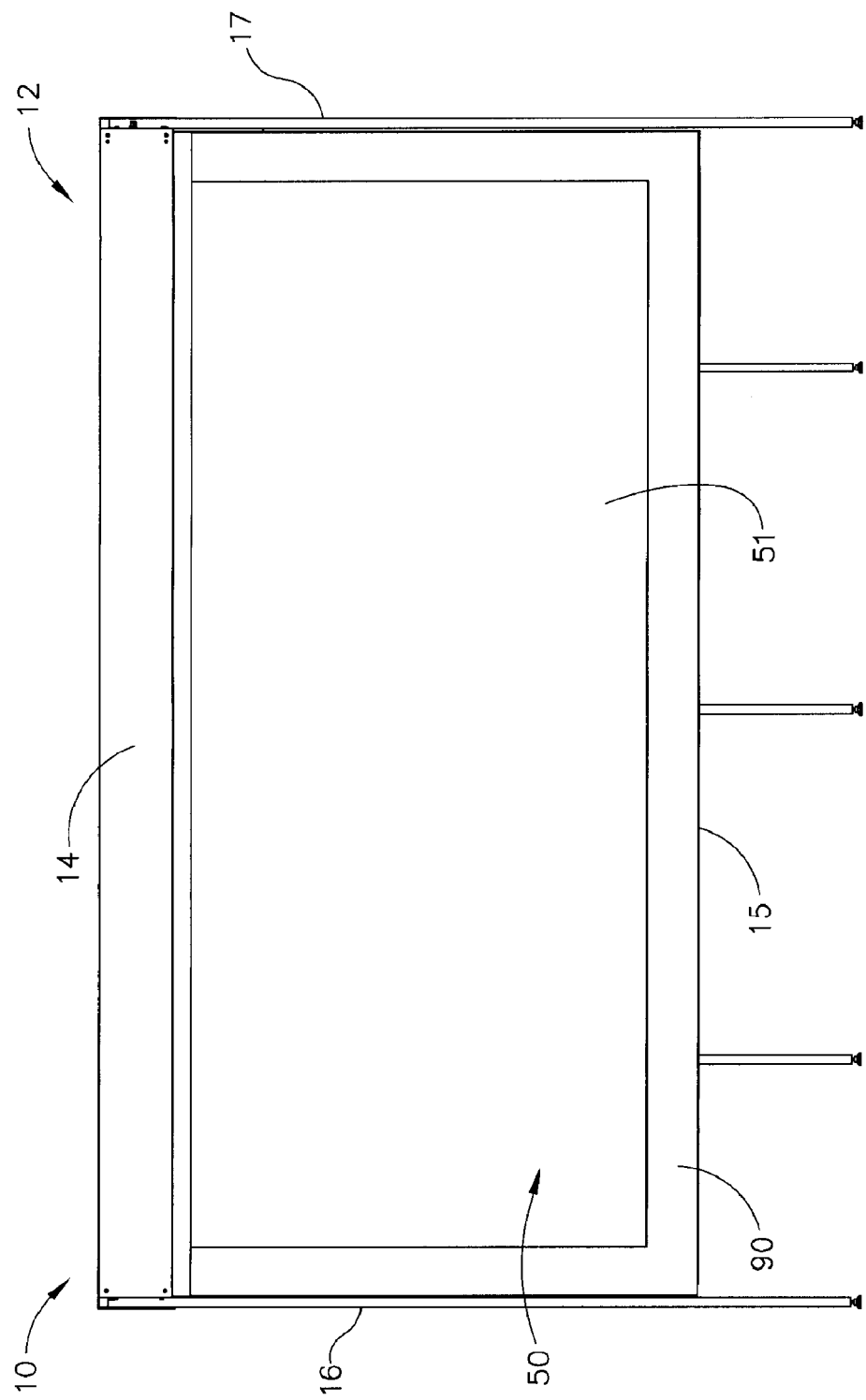
FIG. 3 is a front view of the projection screen structure of FIG. 1.
Figure 4:
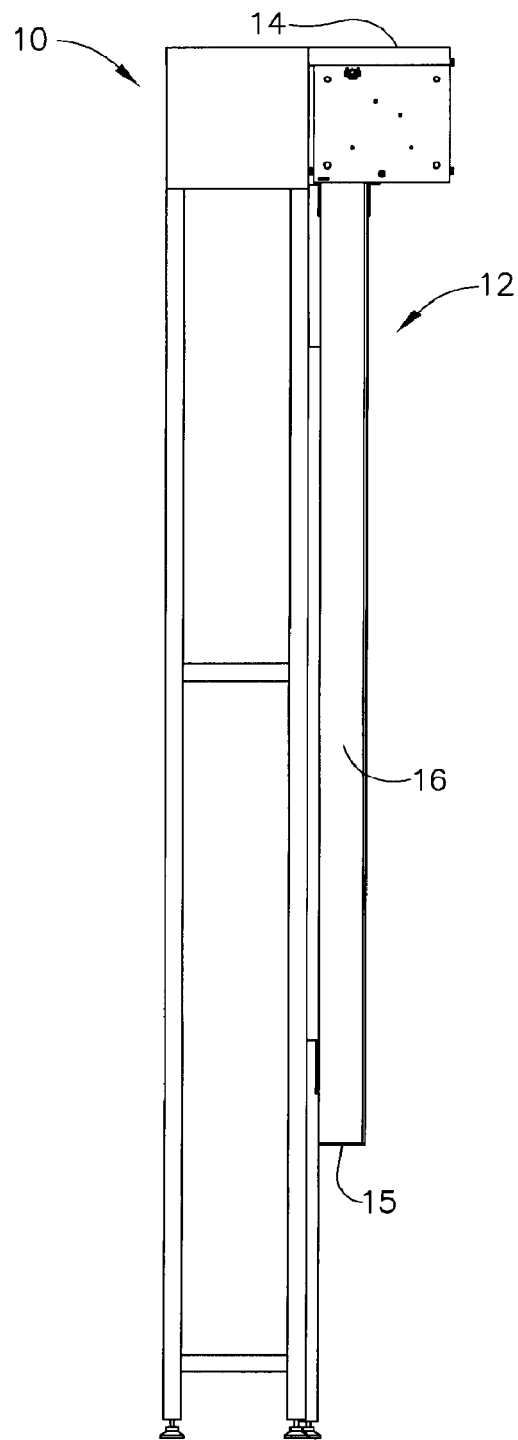
FIG. 4 is a left side view of the projection screen structure of FIG. 1.
Figure 5:
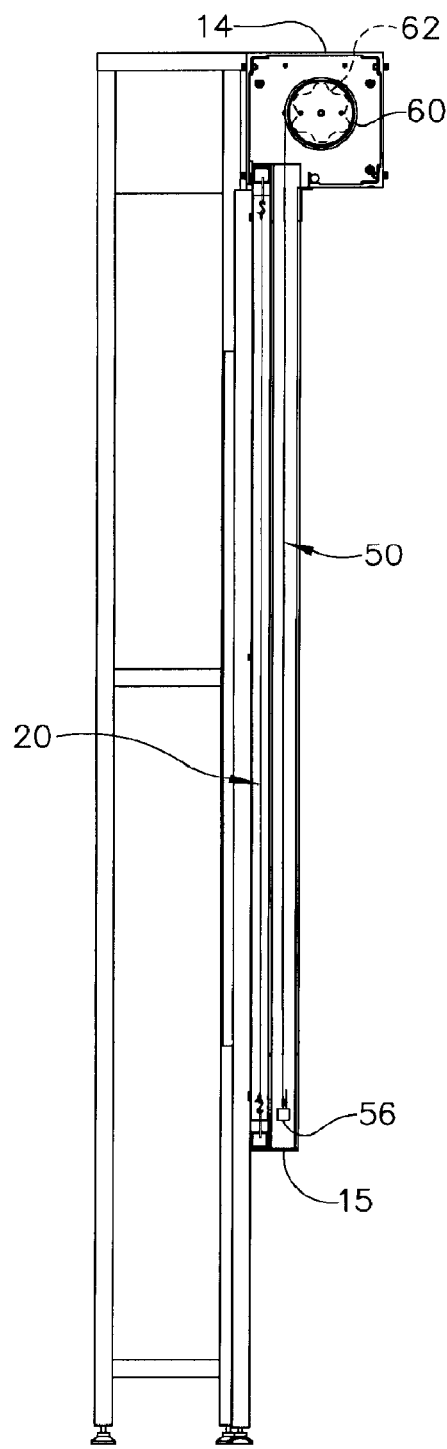
FIG. 5 is a section view of the projection screen structure of FIG. 1, taken along line 5-5.
Figure 7:
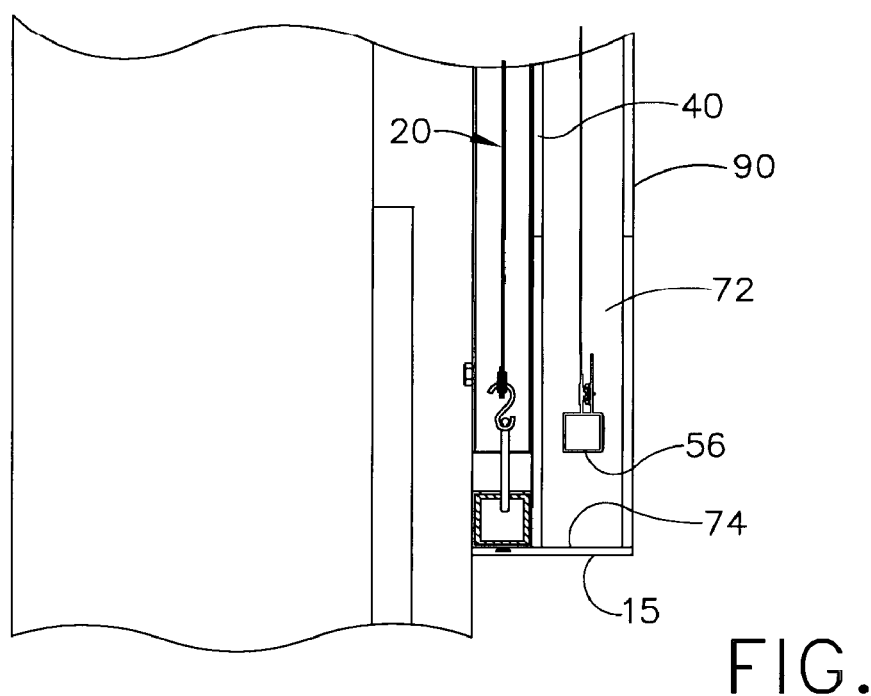
FIG. 7 is an enlarged section view of a lower portion of the projection screen structure of FIG. 5.

Referring now to the accompanying drawings, FIG. 1 and FIG. 2, show front and back perspective views of an integral projection screen structure 10 comprising a fixed projection screen 20 on the back side of the structure and a movable projection screen 50 on the front side of the structure. These screens are encased in a frame 12 having generally parallel top and bottom portions, 14 and 15 respectively, and generally parallel first and second side portions, 16 and 17. The bottom 15, first side 16, and second side 17 portions of the frame each have a channel therein, such as channels 72 and 74 shown in FIG. 7, to receive the edges of the movable screen 50. FIG. 3 is a front view of the projection screen structure of FIG. 1.

Figure 8:
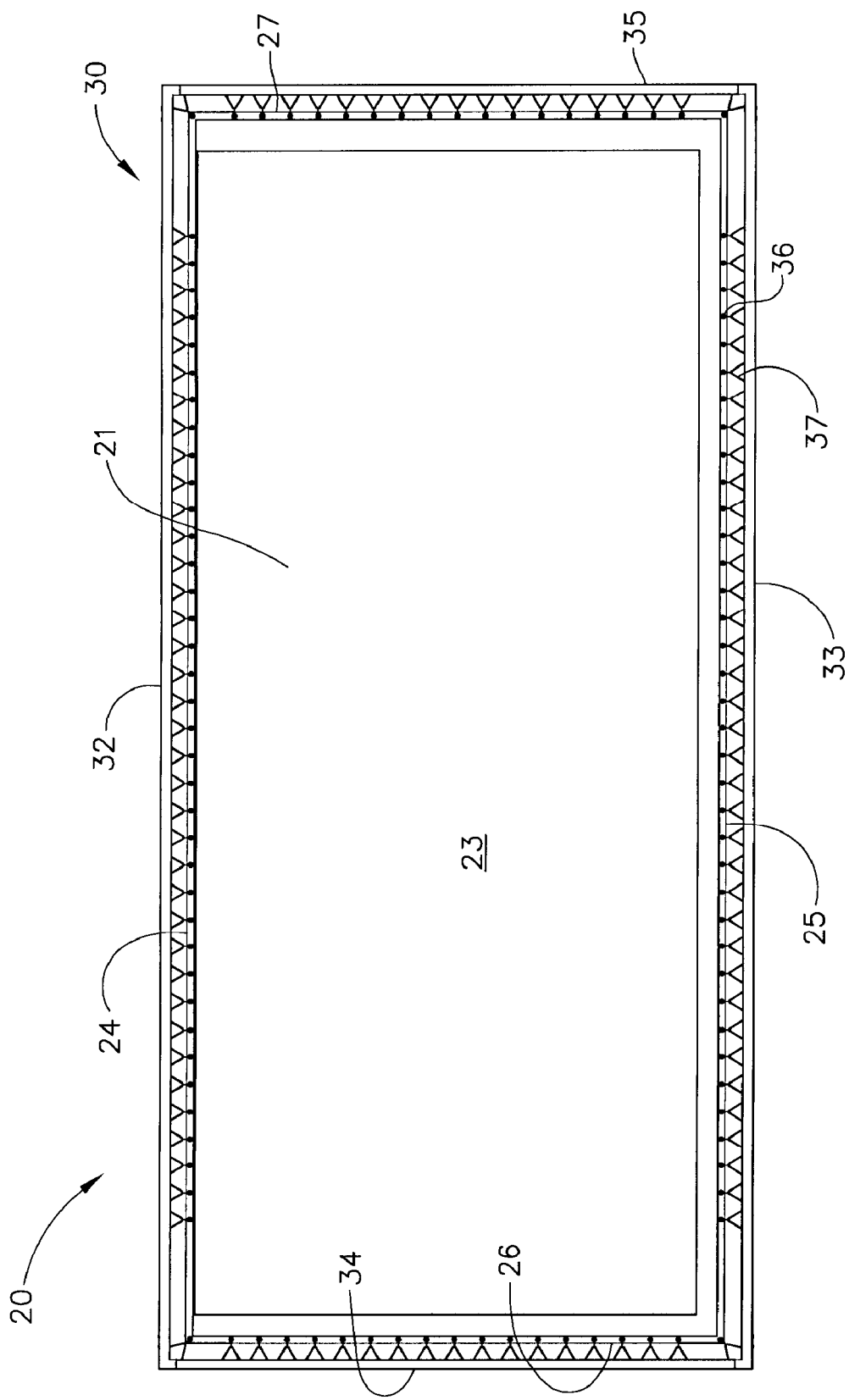
FIG. 8 is a rear view of the fixed projection screen of the projection screen structure of FIG. 1.
Figure 9:
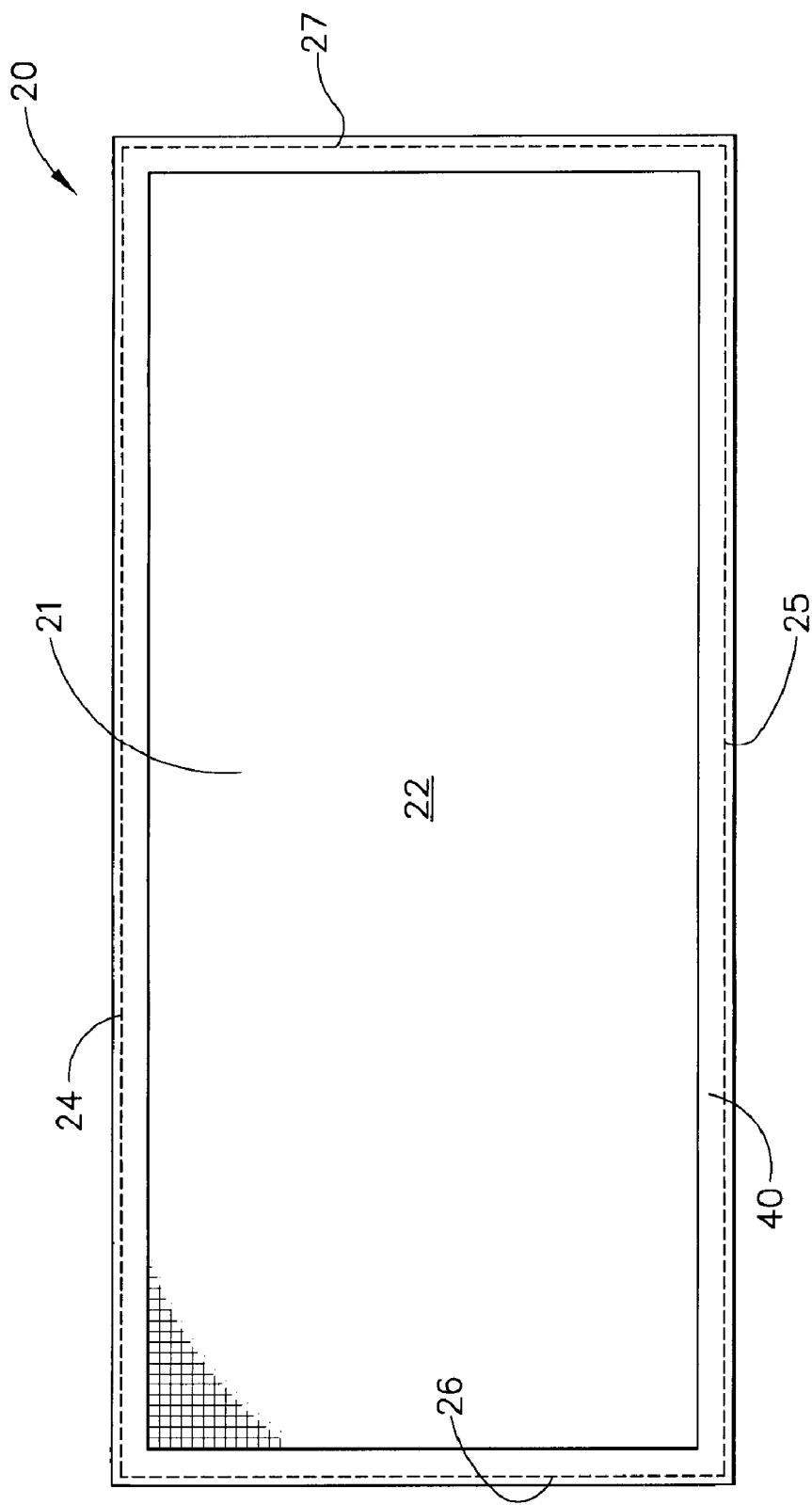
FIG. 9 is a front view of the fixed projection screen and first masking panel of the projection screen structure of FIG. 1.

As shown in FIGS. 8-9, fixed projection screen 20 has a sheet of material 21 mounted to mounting structure 30. The sheet of material 21 has front 22 and a back 23, top edge 24 and bottom edge 25, and first and second side edges, 26 and 27 respectively. For the fixed projection screen 20, screen size may typically be of width up to about 12 feet with a fixed height defining a width to height ratio in the range of about 1 to 3. The sheet typically has a thickness of from about 0.01 inches to about 0.25 inches, more typically from about 0.02 inches to about 0.1 inches.

In order to assemble fixed projection screen 20 using the representative embodiment illustrated in the figures, sheet of material 21 and mounting structure 30 are provided with mounting means by which sheet of material 21 can be tensioned (stretched) and attached to mounting structure 30. The sheet of material 21 may be attached to the mounting structure 30 using means that achieve the objective of sufficiently tensioning the sheet of material 21, the specific mounting means considered are not limiting of the invention or of the appended claims. The sheet of material 21 is tensioned (stretched) to the shape of the mounting structure. The mounting structure 30 typically has substantially parallel top portion 32 and bottom portion 33 and parallel first side portion 34 and second side portion 35. The corresponding edges or portions of the sheet material 21 are attached to the mounting structure 30 via a mounting system, for example, top edge 24 is paired with mounting structure top portion 32. In one embodiment of the invention, the screen material can have applied to its periphery grommets or eyelets 36 for attachment of the screen material to mounting structure 30 using peripheral lacing 37. Other mounting systems may include tape or vinyl binding, or the mounting system can comprise snaps attached to the mounting structure. The sheet of material 21 is then typically tensioned manually and attached to mounting structure 30 as suggested in FIG. 8.

As shown in FIG. 9, a first masking panel 40 is disposed within the frame 12 over at least the respective first and second side edges of the front side of the sheet of material in the fixed projection screen. Typically, the first masking panel is also disposed over the top and bottom edges of the front side of the sheet of material and surrounds the fixed projection screen 20. The masking panel provides enhanced light absorbance and reduced reflectivity in an image displayed on the sheet of material 21. Masking panel 40 typically has a matte or flat appearance and has a rigid frame made of any suitable material, such as steel, aluminum, plastic, or wood panels, covered with an upholstered or knit fabric, such as velour or velvet.

Figure 10:
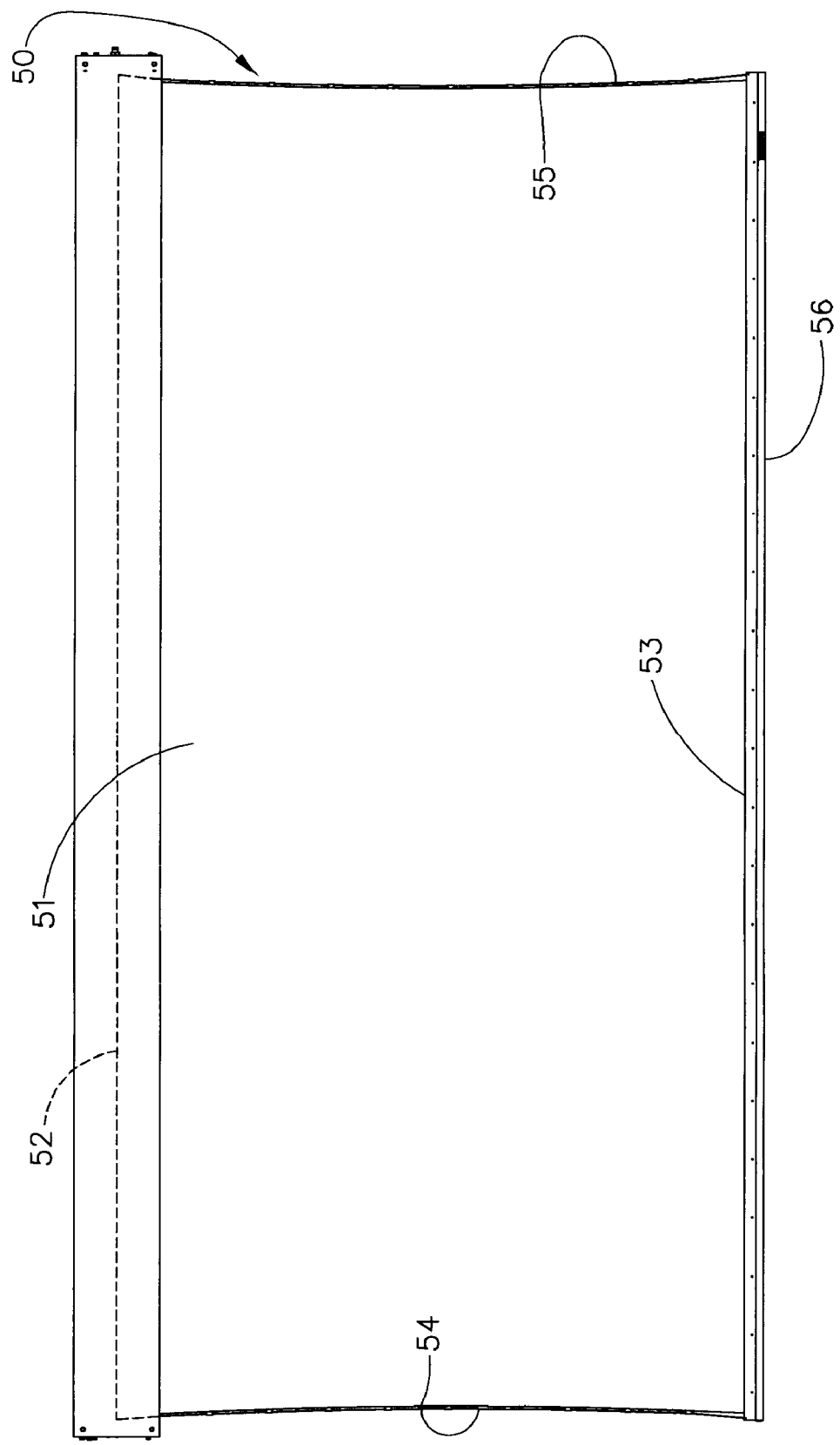
FIG. 10 is a front view of the movable projection screen of the projection screen structure of FIG. 1.

The projection screen structure 10 further comprises a movable projection screen 50. As shown in FIG. 3 and FIG. 10, movable projection screen 50 comprises flexible sheet of material 51, which has a top edge 52 for connection to the roller (see FIG. 6), a bottom edge 53 opposite the top edge 52, and first and second side edges, 54 and 55 respectively, defining a width of the screen. Movable projection screen 50 can be raised and lowered from frame top portion 14 such that the first side edge 54 and second side edge 55 of flexible sheet of material 51 are slidably movable within channel 70 (not shown) of first frame side portion 16 and channel 72 of second frame side portion 17 (see FIG. 7). The bottom edge of the flexible sheet of material 51 is defined by hem bar 56, which provides a weight to keep the screen taut. The hem bar may be made of any suitable material, for example metal, glass, fiberglass, ceramic or plastic. When movable projection screen 50 is fully lowered to engage frame bottom portion 15, hem bar 56 resides within bottom frame channel 74 of frame bottom 15 (see FIG. 7). Flexible sheet of material 51 is sized to substantially cover the frame, and may typically be of width up to about 12 feet with a fixed height defining a width to height ratio in the range of about 1 to 3. The sheet typically has a thickness of from about 0.01 inches to about 0.25 inches, more typically from about 0.02 inches to about 0.1 inches.

Figure 6:
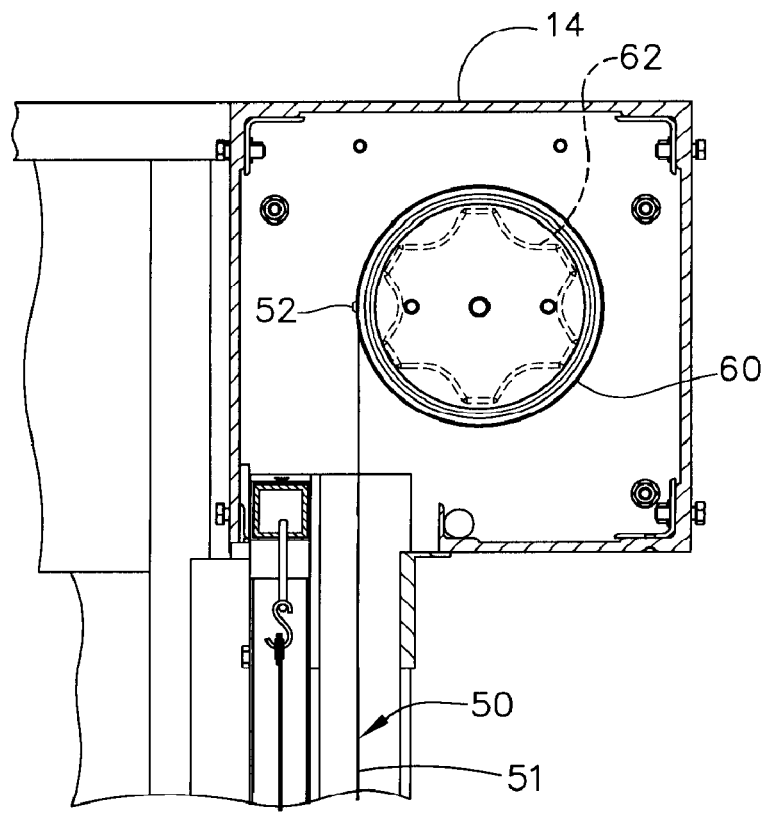
FIG. 6 is an enlarged section view of the upper portion of the projection screen structure of FIG. 5.

As shown in FIG. 6, the top edge 52 of the flexible sheet of material 51 is attached to roller 60 using means known in the art, for example by using adhesive tape, double-sided adhesive tape, glue, staples, screws or other fasteners. Roller 60 may be made from any material that is sufficiently rigid to support the weight of movable screen 50, such as aluminum, steel, or carbon composite. Roller 60 is cut to appropriate length depending on the size of the frame.

Roller 60 is operatively connected to motor 62 such that roller 60 rotates about its longitudinal axis in response to the operation of the motor. In this manner, rotation of roller 60 by motor 62 causes flexible sheet of material 51 to be raised and lowered with respect to frame top portion 14. Thus, movable projection screen 50 is movable between a rolled condition in which the screen is rolled about roller 60 and an unrolled condition in which the screen substantially covers frame. In one possible embodiment, motor 62 may be connected to a motor bracket through a motor retaining. The motor end of roller 60 is then mounted through the motor bracket and mounted to the other side of the frame through an idler bracket and mounting bracket.

Motor 62 may receive control signals from any suitable source such as an infrared (IR) or radio frequency (RF) remote control or a low-voltage wall control. The motor typically is powered from a conventional 120-volt ac wall receptacle, and may be hardwired within a junction box, or to a building distribution panel, or through a 120:24 transformer. It will also be appreciated that other mechanisms, such as a hand crank or a bi-directional clutch, may be utilized for raising and lowering the screen, and that such mechanisms are within the scope of the present invention.

As shown in FIG. 1, a second masking panel 90 is disposed within the frame 12 over at least the respective first and second side edges of the front side of the sheet of material in the movable projection screen. Typically, the masking panel is also disposed over the top and bottom edges of the front side of the sheet of material and surrounds the movable projection screen 50. The masking panel provides enhanced light absorbance and reduced reflectivity in an image displayed on the flexible sheet of material 51. Masking panel 90 typically has a matte or flat appearance and has a rigid frame made of any suitable material, such as steel, aluminum, plastic, or wood panels, covered with an upholstered or knit fabric, such as velour or velvet.

In one embodiment, the side masking panels 40 and 90 may be electronically controllable in order to selectively define a desired image area on the screen surfaces defined by materials 21 and 51, for viewing images projected in different aspect ratios. Masking panels 40 and 90 can be selectively movable using electronically controllably (including infrared remote controlled) motorized means.

The projection screen material for the fixed projection screen and the movable projection screen may comprise any suitable flexible screen material known in the art and selected in accordance with the teachings herein, such as polyvinyl chloride (PVC), acrylic, woven cloth or other material, including commercially available screen materials useful in practicing the invention, such as Stewart Filmscreen Corporation FIREHAWK, GRAYHAWK, ULTRAMATTE 150, VIDEOMATTE 200, and STUDIOTEK 130 projection screen fabrics, or their equivalents. The screen material may optionally have a surface treatment thereon in the form of a pearlescent spray treatment or the like for attaining a selected amount of optical gain for the projection surface, or for generally improving the optical gain of the projection surface. Typical white matte finish surfaces exhibit a gain of about 1.0. Gains of about 1.0 to 2.0 are typical for the materials and surface finishes contemplated herein. Such surface treatment may be particularly desirable for front projection screens herein.

The present invention thus provides an integral projection screen structure for use in displaying imagery from a television, motion picture projection, video projection, computer generated image display, or the like, wherein said structure comprises a frame, fixed projection screen, first mask, movable projection screen, and second mask, all within the frame. The fixed projection screen and the movable projection screen are arranged in such a way that both are located in nearly the same optical plane so that there is no need to refocus the optical projection equipment that is used to project the image on the two screens. In one embodiment, the first and second masks are made of the same covering materials, and the appearance of the fixed screen and the movable screen is substantially similar, so that the two screens have a similar appearance to the viewer. The viewer thus may not notice the difference between the two screens unless the movable screen is in motion. While the appearance of the fixed screen and movable screen is substantially similar, the optical properties of the screens are different in order to facilitate the formatting of various kinds of projected imagery. In one embodiment, the fixed screen comprises silver matte material to better project 3-D images and the movable screen comprises white matte material to provide similar brightness from all viewing angles.

In another aspect, the invention relates to a method for manufacturing an integral projection screen structure for displaying an image from a projection source, comprising the steps of: (a) providing a frame having generally parallel top and bottom portions and generally parallel first and second opposing side portions, each side portion forming a channel; (b) providing a fixed projection screen comprising a sheet of material having a projection surface for displaying an image projected thereon, said sheet of material having a front side and a back side, top and bottom edges and first and second side edges; a fixed mounting structure defined by generally parallel top and bottom portions and generally parallel side portions for supporting said sheet of material in a mounted condition; and means for tensioning said sheet of material onto said mounting structure; said fixed projection screen being disposed within and mounted to said frame; (c) providing a first masking panel disposed within said frame over at least the respective first and second side edges of the front side of the sheet of material in the fixed projection screen; (d) providing a movable projection screen disposed within said frame adjacent the first masking panel, said movable projection screen comprising an operable roller for rolling and unrolling the screen and being mounted at the top portion of said frame; and a flexible sheet of material having a projection surface for displaying an image projected thereon, said sheet of material having a front side and a back side, a top edge connected to the roller and being movable between a rolled condition and an unrolled condition, a bottom edge opposite the top edge, and first and second opposing side edges for disposition within the channels formed by the side portions of the frame when the sheet is in the unrolled condition; and (e) providing a second masking panel disposed within said frame over at least the respective first and second side edges of the front side of the sheet of material in the movable projection screen.

While particular embodiments of the invention have been described, the invention can be further modified within the spirit and scope of this disclosure. This application is therefore intended to cover any variations, uses or adaptations of the invention using its general principles. Further, the application is intended to cover such departures from the present disclosure as come within known or customary practice in the art to which this invention pertains and which fall within the limits of the appended claims.

What is claimed is:

1. An integral projection screen structure for displaying an image from a projection source, comprising:
    (a) a frame having generally parallel top and bottom portions and generally parallel first and second opposing side portions, each side portion forming a channel;
    (b) a fixed projection screen comprising a sheet of material having a projection surface for displaying an image projected thereon, said sheet of material having a front side and a back side, top and bottom edges and first and second side edges; a fixed mounting structure defined by generally parallel top and bottom portions and generally parallel side portions for supporting said sheet of material in a mounted condition; and means for tensioning said sheet of material onto said mounting structure; said fixed projection screen being disposed within and mounted to said frame;
    (c) a first masking panel disposed within said frame over at least the respective first and second side edges of the front side of the sheet of material in the fixed projection screen;
    (d) a movable projection screen disposed within said frame adjacent the first masking panel, said movable projection screen comprising an operable roller for rolling and unrolling the screen and being mounted at the top portion of said frame; and a flexible sheet of material having a projection surface for displaying an image projected thereon, said sheet of material having a front side and a back side, a top edge connected to the roller and being movable between a rolled condition and an unrolled condition, a bottom edge opposite the top edge, and first and second opposing side edges for disposition within the channels formed by the side portions of the frame when the sheet is in the unrolled condition; and (e) a second masking panel disposed within said frame over at least the respective first and second side edges of the front side of the sheet of material in the movable projection screen.

2. The projection screen structure of claim 1 wherein said tensioning means in the fixed projection screen includes snaps disposed around the periphery of said sheet of material with mating snaps on said mounting structure or grommets on the periphery of said sheet of material with peripheral lacing attachment to said mounting structure.

3. The projection screen structure of claim 1 wherein the movable projection screen comprises a motor operatively connected to the roller such that the roller rotates about its longitudinal axis in response to the operation of the motor.

4. The projection screen structure of claim 3 wherein the top portion of the frame houses the roller and the motor, and the bottom portion of the frame forms a channel for receiving the bottom edge of the flexible sheet of material when the sheet is in the unrolled condition.

5. The projection screen structure of claim 1 wherein the sheet of material in the fixed projection screen and in the movable projection screen is selected from the group consisting of polyvinyl chloride, woven cloth and acrylic.

6. The projection screen structure of claim 1 wherein the sheet of material in the fixed projection screen and in the movable projection screen has a thickness of from about 0.01 inches to about 0.25 inches.

7. The projection screen structure of claim 1 further comprising electronically controllable motorized means operatively connected to said first and second masking panels for selectively moving said masking panels.

8. The projection screen structure of claim 1 wherein said first and second masking panels are made of velour material.

9. An integral projection screen structure for displaying an image from a projection source, comprising:
(a) a frame having generally parallel top and bottom portions and generally parallel first and second opposing side portions, each side portion forming a channel;
(b) a fixed projection screen comprising a sheet of material having a projection surface for displaying an image projected thereon, said sheet of material having a front side and a back side, top and bottom edges and first and second side edges; a fixed mounting structure defined by generally parallel top and bottom portions and generally parallel side portions for supporting said sheet of material in a mounted condition; and means for tensioning said sheet of material onto said mounting structure; said fixed projection screen being disposed within and mounted to said frame;
(c) a first masking panel disposed within said frame over at least the respective first and second side edges of the front side of the sheet of material in the fixed projection screen;
(d) a movable projection screen disposed within said frame adjacent the first masking panel, said movable projection screen comprising an operable roller for rolling and unrolling the screen and being mounted at the top portion of said frame; a motor operatively connected to the roller such that the roller rotates about its longitudinal axis in response to the operation of the motor; and a flexible sheet of material having a projection surface for displaying an image projected thereon, said sheet of material having a front side and a back side, a top edge connected to the roller and being movable between a rolled condition and an unrolled condition, a bottom edge opposite the top edge, and first and second opposing side edges for disposition within the channels formed by the side portions of the frame when the sheet is in the unrolled condition; and
(e) a second masking panel disposed within said frame over at least the respective first and second side edges of the front side of the sheet of material in the movable projection screen.

10. The projection screen structure of claim 9 wherein in the fixed projection screen said tensioning means includes snaps disposed around the periphery of said sheet of material with mating snaps on said mounting structure or grommets on the periphery of said sheet of material with peripheral lacing attachment to said mounting structure.

11. The projection screen structure of claim 9 wherein the top portion of the frame houses the roller and the motor, and the bottom portion of the frame forms a channel for receiving the bottom edge of the flexible sheet of material when the sheet is in the unrolled condition.

12. The projection screen structure of claim 9 wherein the sheet of material in the fixed projection screen and in the movable projection screen is selected from the group consisting of polyvinyl chloride, woven cloth and acrylic.

13. The projection screen structure of claim 9 wherein the sheet of material in the fixed projection screen and in the movable projection screen has a thickness of from about 0.01 inches to about 0.25 inches.

14. The projection screen structure of claim 9 further comprising electronically controllable motorized means operatively connected to said first and second masking panels for selectively moving said masking panels.

15. The projection screen structure of claim 14 wherein the top portion of the frame houses the roller and the motor, and the bottom portion of the frame forms a channel for receiving the bottom edge of the flexible sheet of material when the sheet is in the unrolled condition.

16. The projection screen structure of claim 15 wherein the sheet of material in the fixed projection screen and in the movable projection screen is selected from the group consisting of polyvinyl chloride, woven cloth and acrylic, and has a thickness of from about 0.01 inches to about 0.25 inches.

17. An integral projection screen structure for displaying an image from a projection source, comprising:
(a) a frame having generally parallel top and bottom portions and generally parallel first and second opposing side portions, each side portion forming a channel;
(b) a fixed silver projection screen comprising a sheet of material having a projection surface for displaying an image projected thereon, said sheet of material having a front side and a back side, top and bottom edges and first and second side edges; a fixed mounting structure defined by generally parallel top and bottom portions and generally parallel side portions for supporting said sheet of material in a mounted condition; and means for tensioning said sheet of material onto said mounting structure; said fixed projection screen being disposed within and mounted to said frame;
(c) a first masking panel disposed within said frame over at least the respective first and second side edges of the front side of the sheet of material in the fixed projection screen;
(d) a movable, white matte projection screen disposed within said frame adjacent the first masking panel, said movable projection screen comprising an operable roller for rolling and unrolling the screen and being mounted at the top portion of said frame; a motor operatively connected to the roller such that the roller rotates about its longitudinal axis in response to the operation of the motor; and a flexible sheet of material having a projection surface for displaying an image projected thereon, said sheet of material having a front side and a back side, a top edge connected to the roller and being movable between a rolled condition and an unrolled condition, a bottom edge opposite the top edge, and first and second opposing side edges for disposition within the channels formed by the side portions of the frame when the sheet is in the unrolled condition; and (e) a second masking panel disposed within said frame over at least the respective first and second side edges of the front side of the sheet of material in the movable projection screen.

18. The projection screen structure of claim 17 wherein the movable projection screen comprises a motor operatively connected to the roller such that the roller rotates about its longitudinal axis in response to the operation of the motor.

19. The projection screen structure of claim 18 wherein the top portion of the frame houses the roller and the motor, and the bottom portion of the frame forms a channel for receiving the bottom edge of the flexible sheet of material when the sheet is in the unrolled condition.

20. The projection screen structure of claim 19 wherein the sheet of material in the fixed projection screen and in the movable projection screen is selected from the group consisting of polyvinyl chloride, woven cloth and acrylic.

21. The projection screen structure of claim 20 wherein the first and second masking panels are each made of the same velour material.

\* \* \* \* \*